United States Patent
Kanarek

(10) Patent No.: US 12,228,985 B1
(45) Date of Patent: Feb. 18, 2025

(54) DEVICE, SYSTEM, AND METHOD FOR PROVIDING POWER FROM A USB-C PD CONNECTION

(71) Applicant: Core SWX, LLC, Plainview, NY (US)

(72) Inventor: Ross Kanarek, Plainview, NY (US)

(73) Assignee: Core SWX, LLC, Plainview, NY (US)

( * ) Notice: Subject to any disclaimer, the term of this patent is extended or adjusted under 35 U.S.C. 154(b) by 0 days.

(21) Appl. No.: 18/428,874

(22) Filed: Jan. 31, 2024

(51) Int. Cl.
| | |
|---|---|
| *G06F 1/00* | (2006.01) |
| *G06F 1/26* | (2006.01) |
| *H01R 13/639* | (2006.01) |
| *H01R 24/60* | (2011.01) |

(52) U.S. Cl.
CPC ......... *G06F 1/266* (2013.01); *H01R 13/6397* (2013.01); *H01R 24/60* (2013.01)

(58) Field of Classification Search
CPC ................................. G06F 1/266; H01R 24/60
See application file for complete search history.

(56) References Cited

U.S. PATENT DOCUMENTS

| | | | | |
|---|---|---|---|---|
| 10,935,221 | B1* | 3/2021 | Tirosh | F21V 23/0464 |
| 11,586,271 | B1* | 2/2023 | Kadam | G06F 1/26 |
| 2015/0249848 | A1* | 9/2015 | Holman | H04N 21/47202 |
| | | | | 348/469 |
| 2016/0330353 | A1* | 11/2016 | Ozawa | H04N 23/51 |
| 2019/0129872 | A1* | 5/2019 | Xu | G06F 13/4282 |
| 2020/0091746 | A1* | 3/2020 | Chien | G06F 1/266 |
| 2020/0106910 | A1* | 4/2020 | Horie | H04N 1/00896 |
| 2021/0167623 | A1* | 6/2021 | Sanghvi | H02J 7/0013 |
| 2023/0051385 | A1* | 2/2023 | Ma | G06F 13/385 |
| 2024/0061483 | A1* | 2/2024 | Kim | H02M 1/10 |

* cited by examiner

*Primary Examiner* — Mohammed H Rehman
(74) *Attorney, Agent, or Firm* — Shore IP Group, PLLC; Sean R. Wilsusen, Esq.

(57) ABSTRACT

A system for providing power from a USB-C PD connection includes a USB-C power delivery (PD) port. The USB-C PD port is configured to provide a number of output voltages. A power cable is configured to be electrically connected with the USB-C PD port. The power cable is configured to transmit at least one voltage of the numerous output voltages to a peripheral device. A housing is coupled with the cable. The housing includes a USB-C connector configured to be removably coupled with the USB-C PD port to electrically connect the power cable with the USB-C PD port. A control circuit assembly is electrically connected with the housing. The control circuit assembly is configured to negotiate an output voltage of the numerous available output voltages between the peripheral device and the USB-C PD port.

16 Claims, 10 Drawing Sheets

```
┌─────────────────────────────────────────────────────────┐
│ Provide a power cable including a housing including a USB-C │ — 1001
│ connector configured to be removably coupled with a USB-C PD │
│ port to electrically connect the power cable with the USB-C PD port │
└─────────────────────────────────────────────────────────┘
                            │
                            ▼
┌─────────────────────────────────────────────────────────┐
│ Negotiate, by a control circuit, and output voltage between a │ — 1002
│ peripheral device and the USB-C PD port                 │
└─────────────────────────────────────────────────────────┘
                            │
                            ▼
┌─────────────────────────────────────────────────────────┐
│ Provide the output voltage to the peripheral device     │ — 1003
└─────────────────────────────────────────────────────────┘
                            │
                            ▼
┌─────────────────────────────────────────────────────────┐
│ Power or charge the peripheral device using the provided output │ — 1004
│ voltage                                                 │
└─────────────────────────────────────────────────────────┘
```

DEVICE, SYSTEM, AND METHOD FOR PROVIDING POWER FROM A USB-C PD CONNECTION

FIELD

The present disclosure relates to a USB-C Power Delivery (PD) connection and, more particularly, to a device, system, and method for providing power from the USB-C PD connection.

BACKGROUND

In the audio visual industry, there are a variety of production accessories that may be used for production. These production accessories can be powered via the same battery pack that is also powering the video/cinematic camera.

With the advent of higher voltage cinema cameras becoming more prominent due to higher power consumption and the camera manufacturer's goal in reducing current draw, the production accessories have also become either accepting of higher voltages or may be dependent upon higher voltages (e.g., as accessory manufacturers are more willing to make the accessories only high voltage accepting given the cameras have been configured that way).

A relatively high voltage power port on cinematic battery packs may provide a power delivery option for higher voltage production accessories.

SUMMARY

The present disclosure describes a secure, multi-voltage connection leveraging a USB-C PD port of a cinematography battery back and/or a USB-C PD port of a battery mount plate and supporting at least a USB-C PD Protocol 3.1 (e.g., offering 5 v, 9 v, 12 v, 15 v, 20 v, as well as 28 v, 36 v, and/or 48 v) or earlier protocols (e.g., USB 1.0, 2.0, or 3.0 standards).

Provided in accordance with aspects of the present disclosure is a system for providing power from a USB-C PD connection including a USB-C power delivery (PD) port. The USB-C PD port is configured to provide a number of output voltages. A power cable is configured to be electrically connected with the USB-C PD port. The power cable is configured to transmit at least one voltage of the numerous output voltages to a peripheral device. A housing is coupled with the cable. The housing includes a USB-C connector configured to be removably coupled with the USB-C PD port to electrically connect the power cable with the USB-C PD port. A control circuit assembly is electrically connected with the housing. The control circuit assembly is configured to negotiate an output voltage of the numerous available output voltages between the peripheral device and the USB-C PD port.

In an aspect of the present disclosure, the system includes a receiving orifice arranged about the USB-C PD port. A mechanical securing assembly extends from the housing. The mechanical securing assembly is arranged about the USB-C connector. The mechanical securing assembly is configured to be removably received in the receiving orifice to securely couple the housing about the USB-C PD port.

In an aspect of the present disclosure, the mechanical securing assembly includes a shroud arranged at least partially circumferentially around the USB-C connector. The shroud is configured to be removably received in the receiving orifice.

In an aspect of the present disclosure, a slot is defined in the receiving orifice. A projection extends from the shroud. The projection is configured to be removably received in the slot.

In an aspect of the present disclosure, a mechanical connection assembly is configured to removably and securely couple the housing about the USB-C PD port. The mechanical connection assembly includes a press-fit connection between the housing and the USB-C PD port, a snap-fit connection between the housing and the USB-C PD port, a tab and slot connection between the housing and the USB-C PD port, a quick-release connection between the housing and the USB-C PD port, or a detent ball connection between the housing and the USB-C PD port.

In an aspect of the present disclosure, a first metal or magnetic member is coupled with the housing. A second metal or magnetic member is arranged about the USB-C PD port. The first metal or magnetic member and the second metal or magnetic member are configured to be removably coupled with each other to securely couple the housing about the USB-C PD port.

In an aspect of the present disclosure, the control circuit assembly is arranged in the housing.

In an aspect of the present disclosure, the control circuit assembly is arranged in a second housing arranged along the power cable. The second housing is spaced apart from the housing including the USB-C connector.

In an aspect of the present disclosure, the USB-C PD port is arranged in a cinematography battery pack.

In an aspect of the present disclosure, the USB-C PD port is configured to charge the cinematography battery pack.

In an aspect of the present disclosure, the USB-C PD port is arranged in a battery mount plate for a cinematography battery pack.

In an aspect of the present disclosure, the battery mount plate includes a V-mount, a B-mount or a 3-stud mount battery connection.

In an aspect of the present disclosure, an electrical connector is defined at an end of the power cable opposite the housing. The electrical connector is configured to connect with a peripheral device to deliver the output voltage to the peripheral device.

In an aspect of the present disclosure, the electrical connector is configured to connect with at least one of a light, a microphone, a camera, a monitor, a tablet computer, a desktop computer, or a laptop computer.

In an aspect of the present disclosure, the possible output voltages include 5 volts, 9 volts, 12 volts, 15 volts, 20 volts, 24 volts, 28 volts, 36 volts, and 48 volts.

In an aspect of the present disclosure, a number of visual indicators are arranged on the housing. The visual indicators are configured to indicate the output voltage of the USB-C PD port.

In an aspect of the present disclosure, a power hub is electrically connected with the power cable. The power hub includes a number of USB-C PD hub ports, each of which is configured to provide at least one of a number of output voltages.

Provided in accordance with aspects of the present disclosure is a power cable for providing power from a USB-C PD connection. The power cable includes a housing including a USB-C connector configured to be removably coupled with a USB-C PD port to electrically connect the power cable with the USB-C PD port. The power cable is configured to transmit at least one of a number of output voltages to a peripheral device from the USB-C PD port. A control circuit assembly is electrically connected with the housing.

The control circuit assembly is configured to negotiate an output voltage between the peripheral device and the USB-C PD port.

Provided in accordance with aspects of the present disclosure is a method of providing power from a USB-C PD connection. The method includes providing a power cable including a housing including a USB-C connector configured to be removably coupled with a USB-C PD port to electrically connect the power cable with the USB-C PD port. The power cable is configured to transmit at least one of a number of output voltages to a peripheral device from the USB-C PD port. A control circuit assembly is electrically connected with the housing. The control circuit assembly is configured to negotiate an output voltage between the peripheral device and the USB-C PD port. The method includes negotiating, by the control circuit, the output voltage between the peripheral device and the USB-C PD port. The method includes providing the output voltage to the peripheral device to power or charge the peripheral device.

BRIEF DESCRIPTION OF THE DRAWINGS

Various aspects and features of the present disclosure are described hereinbelow with reference to the drawings wherein:

FIG. 10 is a method of providing power from a USB-C PD connection according to aspects of the present disclosure.

DETAILED DESCRIPTION

Figure 1:
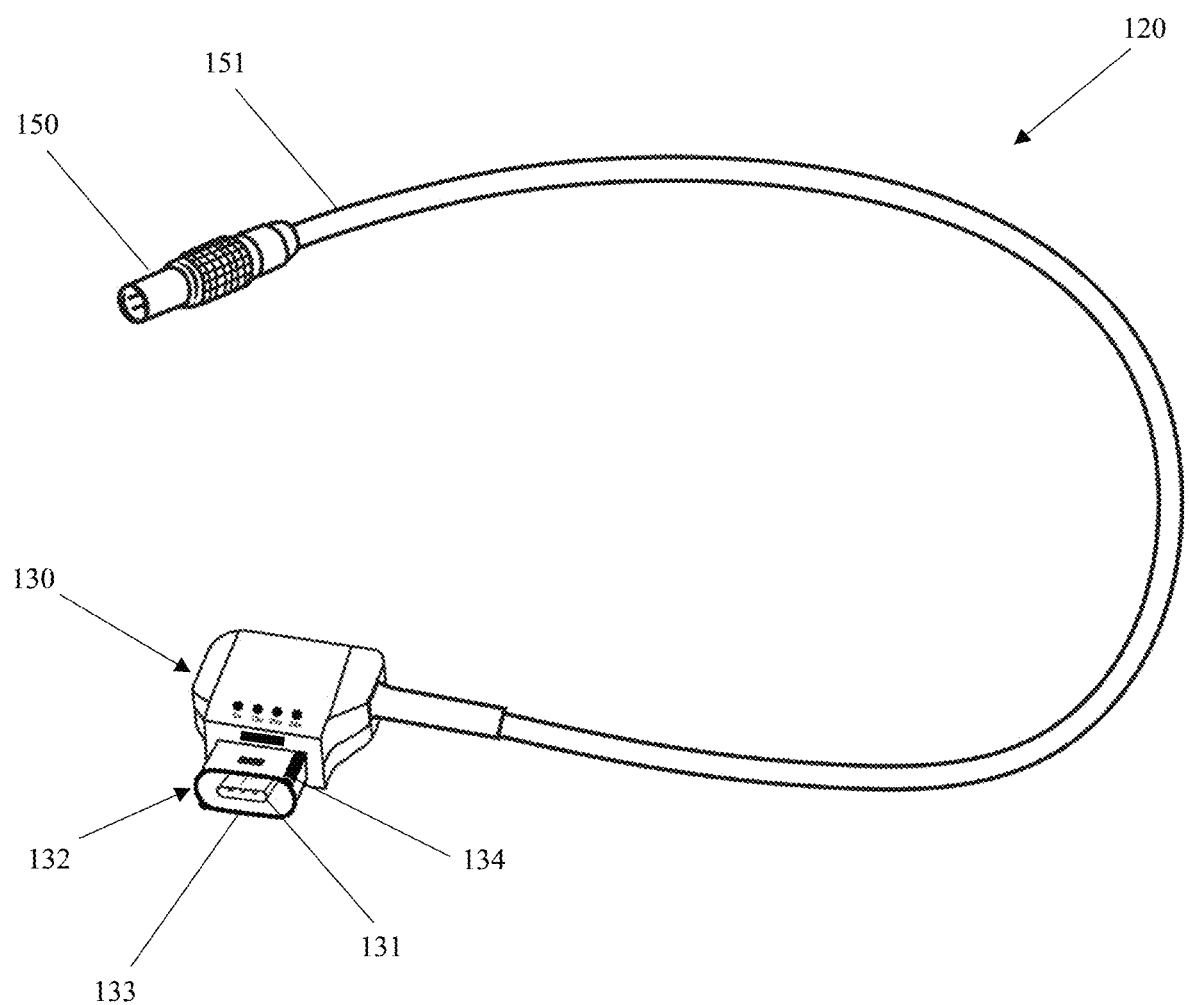
FIG. 1 is a top, perspective view of a power cable for providing power from a USB-C PD connection according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "battery mount," "mount plate," and "battery mount plate" may be used interchangeably herein. The phrases "battery," "battery pack," "cinematography battery," "cinematography battery pack," and "pack" may be used interchangeably herein.

Conventional cinematography accessories have been operable on a mean 12 v system (e.g., 11-17 v), based at least in part on battery packs having voltages available within the voltage range. Conventionally, a powertap or "ptap" was added to battery packs to support multi-draw capability, allowing the camera to be powered from the mains output of the battery pack and then the accessory (e.g., an on-camera light) could be powered from the ptap. Recently, the cinematography industry began utilizing 5 v equipment, and as a result manufacturers started including a USB-A port on battery packs cable of outputting 5 v and several amps of current.

According to aspects of the present disclosure, a USB-C power delivery (PD) port (see, e.g., USB-C PD port 110 in FIGS. 3-6) has been included on a battery pack or a battery mount plate capable of outputting a range of voltages (e.g., offering 5 v, 9 v, 12 v, 15 v, 20 v, as well as 28 v, 36 v, and/or 48 v). The USB-C PD port can be employed to support a range of mobile devices for charging, such as laptops for post-production editing as well as footage organization, or DSLR-type photographic cameras. The USB-C PD port can also be used to allow the battery pack to accept a charge from a USB-C PD charger, such as a USB-C PD charger employed for laptops.

The control circuit (e.g., control circuit 140) described herein is configured to communicate with a USB-C PD port (see, e.g., USB-C PD port 110 in FIGS. 3-6) to determine what voltage to output. The control circuit allows devices not designed to receive USB-C PD power to be powered using a USB-C PD port by negotiating the necessary output voltage by the control circuit. As an example, the power cable (e.g., power cable 120 in FIG. 1 or 720 in FIG. 7) can be adapted to connect with any device not designed for USB-C PD charging and charge such a device through the use of the control circuit, such that the power output needed for the device is selected through use of the control circuit.

The control circuit is configured to negotiate a "handshake" between a device that will receive power from the USB-C PD port and the output power of the USB-C PD port by communicating with each of the device that will receive power from the USB-C PD port and the USB-C PD port itself.

Referring to FIGS. 1-10, a system 100 for providing power from a USB-C PD connection includes a USB-C power delivery (PD) port 110. The USB-C PD port 110 is configured to provide a number of output voltages. The possible output voltages include, for example, 5 volts, 9 volts, 12 volts, 15 volts, 20 volts, 24 volts, 28 volts, 36 volts, and 48 volts.

A power cable 120 is configured to be electrically connected with the USB-C PD port 110. The power cable 120 is configured to transmit at least one voltage of the numerous output voltages to a peripheral device to power and/or charge the peripheral device. For example, the power cable 120 may be configured to transmit the output voltage to at least one of a light, a microphone, a camera, a monitor, a tablet computer, a desktop computer, or a laptop computer from a battery (e.g., battery pack 301) or a battery mount plate (e.g., battery mount plate 501), as described or incorporated by reference herein.

A housing 130 is coupled with the power cable 120. The housing 130 includes a USB-C connector 131 configured to be removably coupled with the USB-C PD port 110 to electrically connect the power cable 120 with the USB-C PD port 110. A control circuit assembly 140 is electrically connected with the housing 130. The control circuit assembly 140 is configured to negotiate an output voltage of the numerous available output voltages between the peripheral device and the USB-C PD port 110.

The control circuit assembly 140 is configured to control the power output of the USB-C PD port 110. The control circuit assembly 140 may include a combination of electronic components such as resistors, capacitors, inductors, transistors, and integrated circuits. The control circuit assembly 140 is configured to receive and/or process an input signal (e.g., from the peripheral device, the USB-C PD port 110, a battery, and/or the battery mount plate, as described herein) to determine at least one of the available output voltages from the battery (e.g., based on the voltage demands and capabilities of the peripheral device). The control circuit assembly 140 may include one or more processing units 201 (e.g., including microcontrollers or programmable logic controllers (PLCs)). The processing unit 201 is configured to execute a set of instructions or a control algorithm to analyze the input signals and determine the appropriate output voltage. The control circuit assembly 140 may include at least one memory 202 configured to store executable computer instructions (e.g., computer software describing one or more algorithms) configured to instruct the processing unit 210 to process the input signals to select the appropriate output voltage. The algorithm(s) define the logic and decision-making process of the control circuit assembly 140. The memory 202 is configured to store the control algorithm, configuration settings, and temporary data employable by the processing unit 210. The memory 202 may include RAM (Random Access Memory) for temporary storage and read-only member (EROM) or Electrically Erasable Programmable Read-Only Memory (EEPROM) for non-volatile storage.

The memory 202 may store firmware (e.g., software or executable computer instructions) configured to control the operation of the control circuit assembly 140 to select the appropriate output voltage for a battery described or incorporated by reference herein. The firmware is updatable, such as to improve or update the operation of the control circuit assembly 140.

Figure 2A:
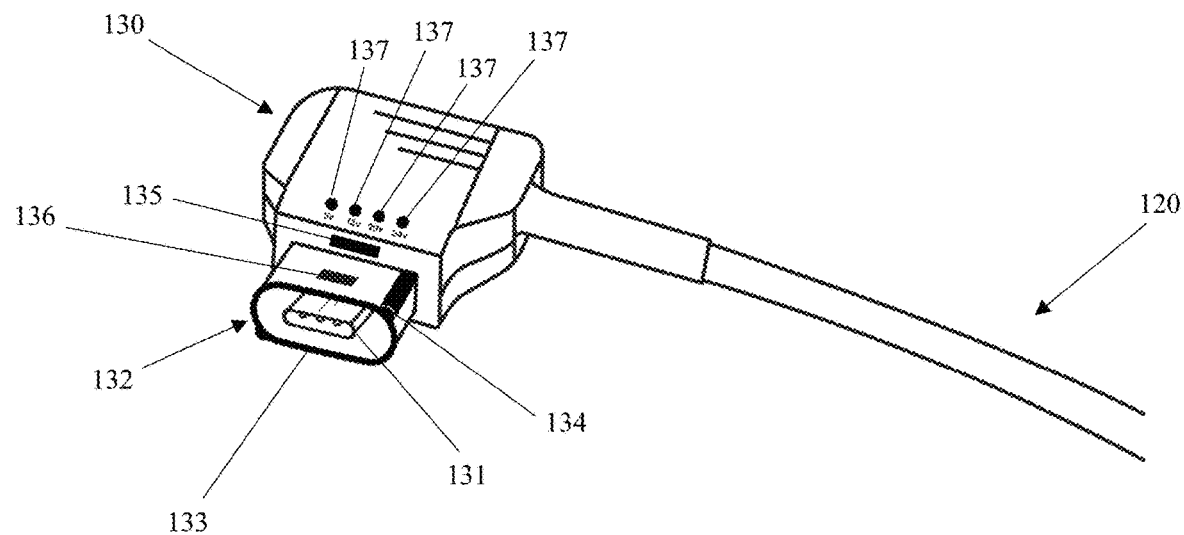
FIG. 2A is a top, perspective view of a USB-C PD connection employable by the power cable of FIG. 1.
Figure 2B:
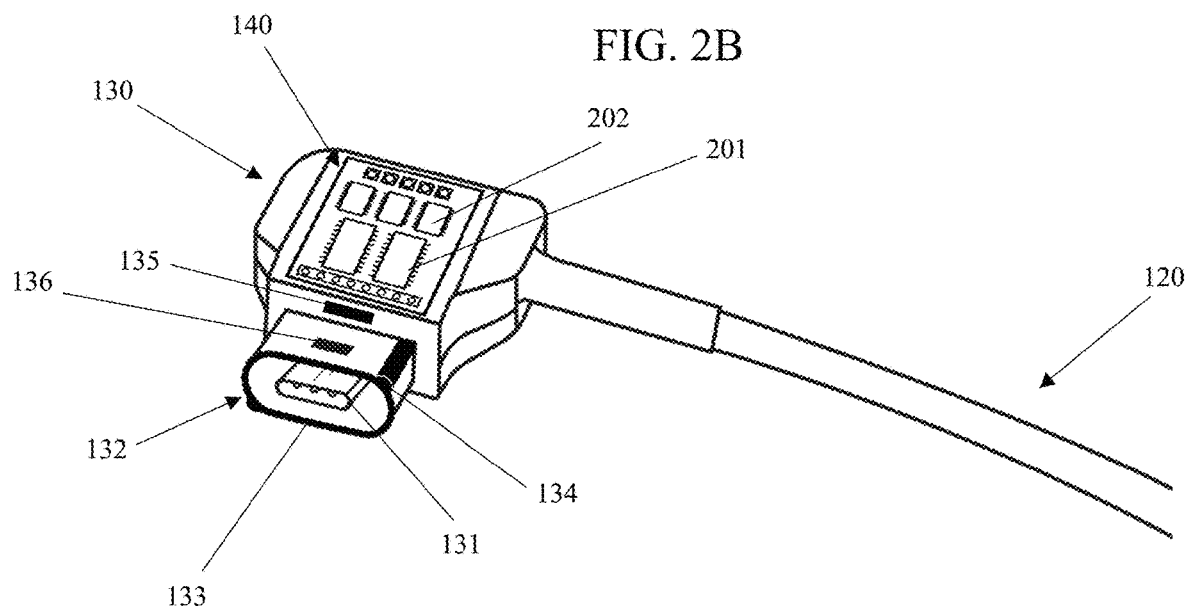
FIG. 2B is an interior view of the control circuit assembly of the USB-C PD connection of FIG. 2A employable by the power cable of FIG. 1.
Figure 3:
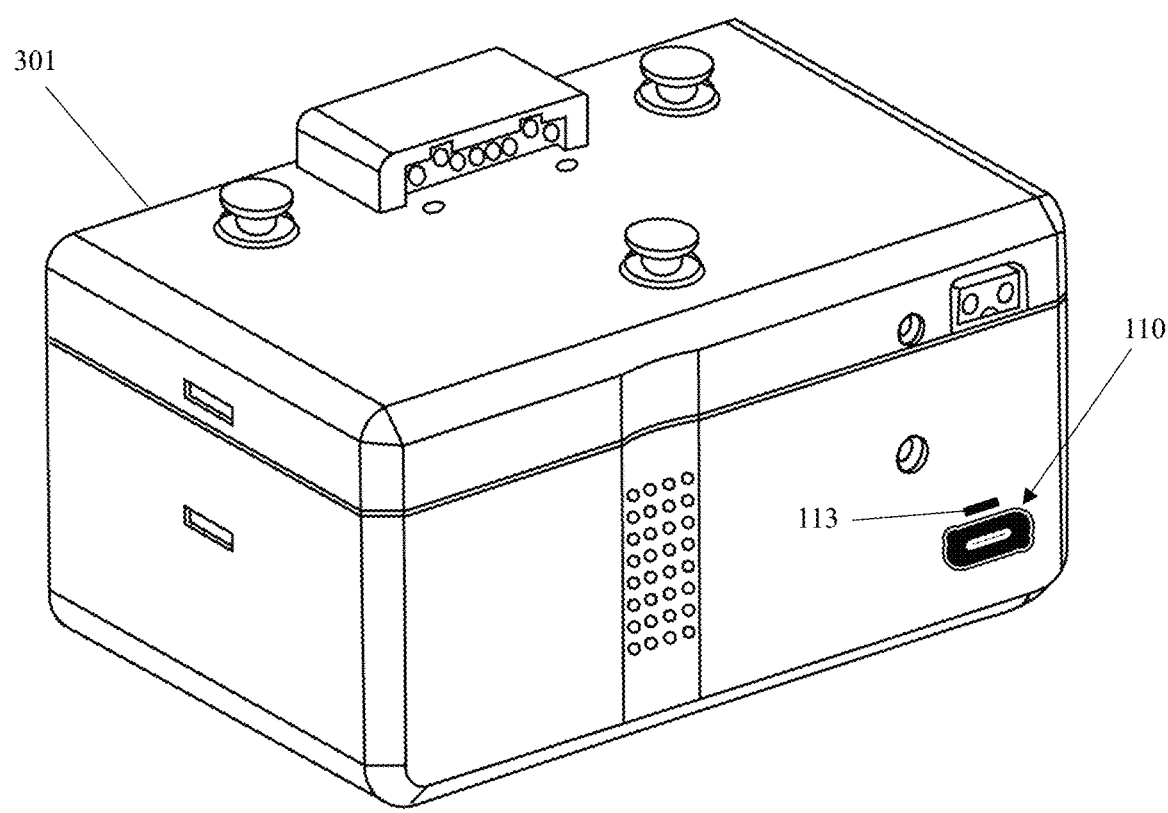
FIG. 3 is a top, perspective view of a cinematography battery pack including a USB-C PD port configured to connect with the USB-C PD connection of the power cable of FIG. 1.
Figure 4:
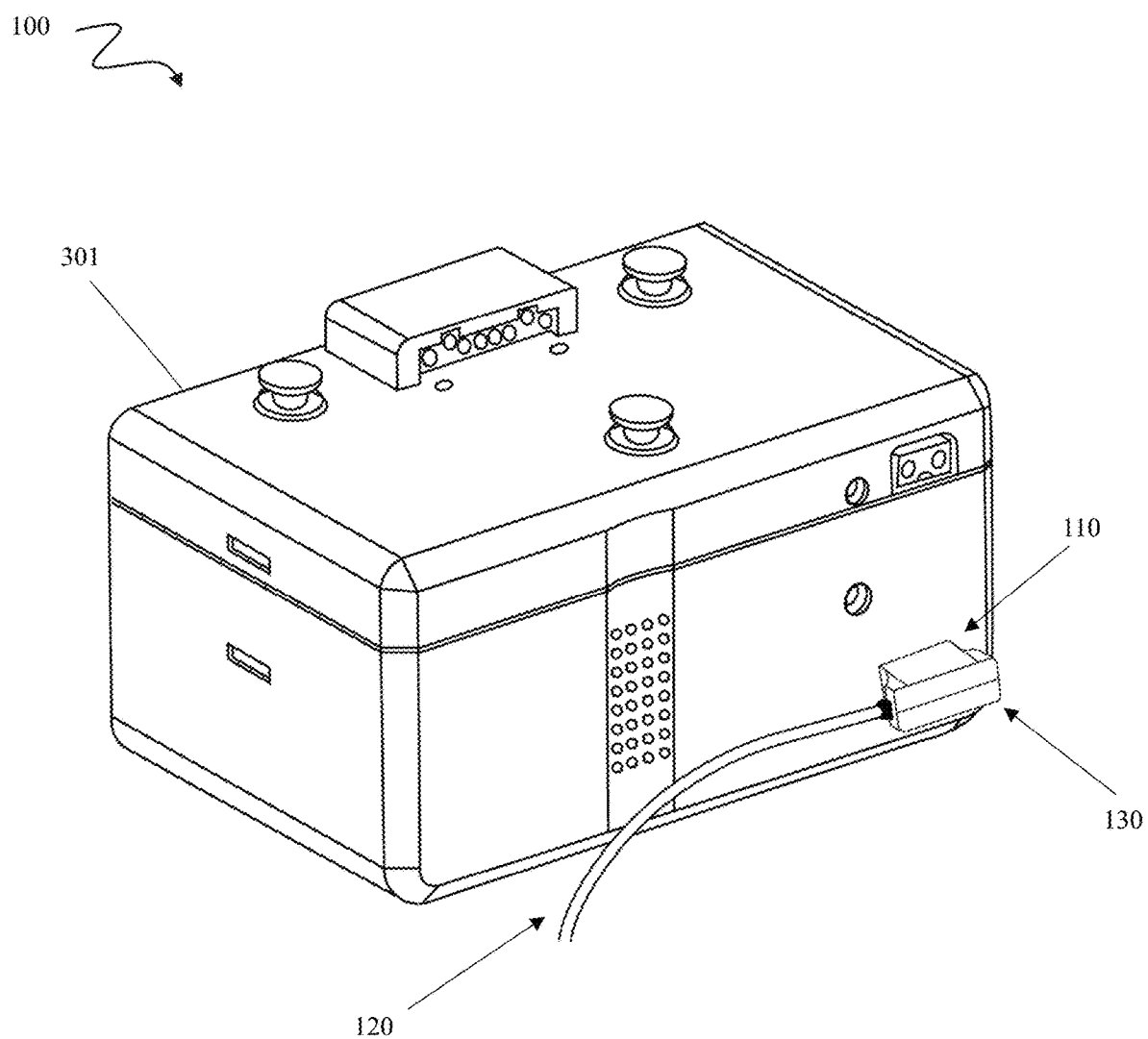
FIG. 4 is a top, perspective view of the power cable of FIG. 1 connected with the USB-C PD port of FIG. 3.
Figure 5:
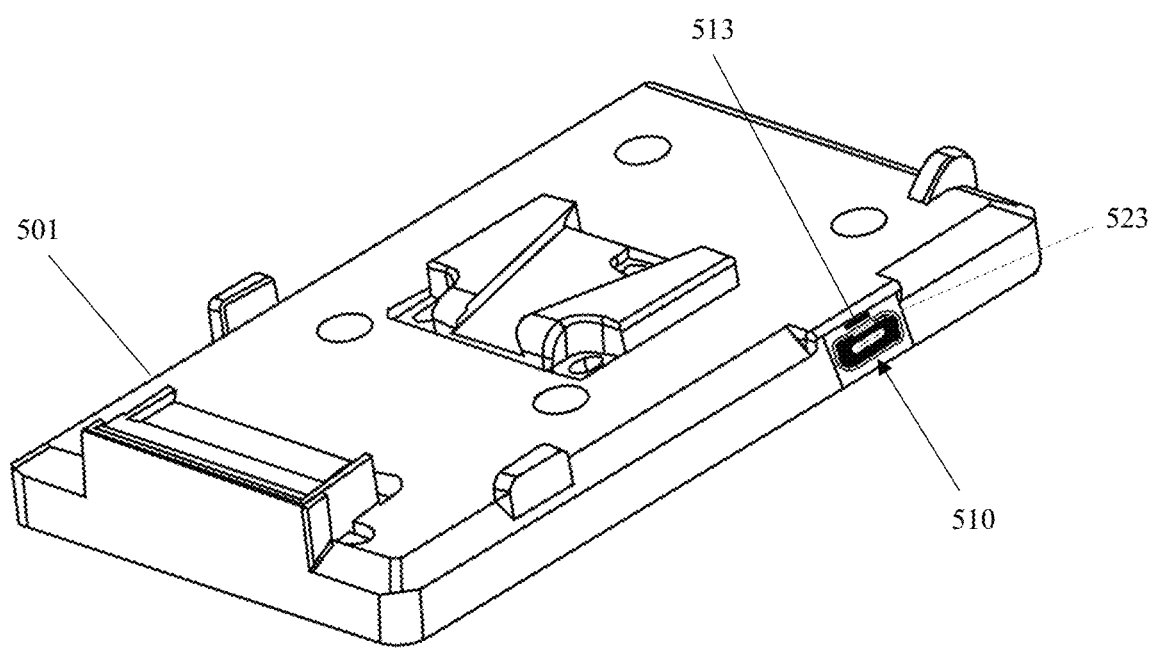
FIG. 5 is a front, perspective view of a battery mount plate for a cinematography battery pack including a USB-C PD port configured to connect with the USB-C PD connection of the power cable of FIG. 1.
Figure 6:
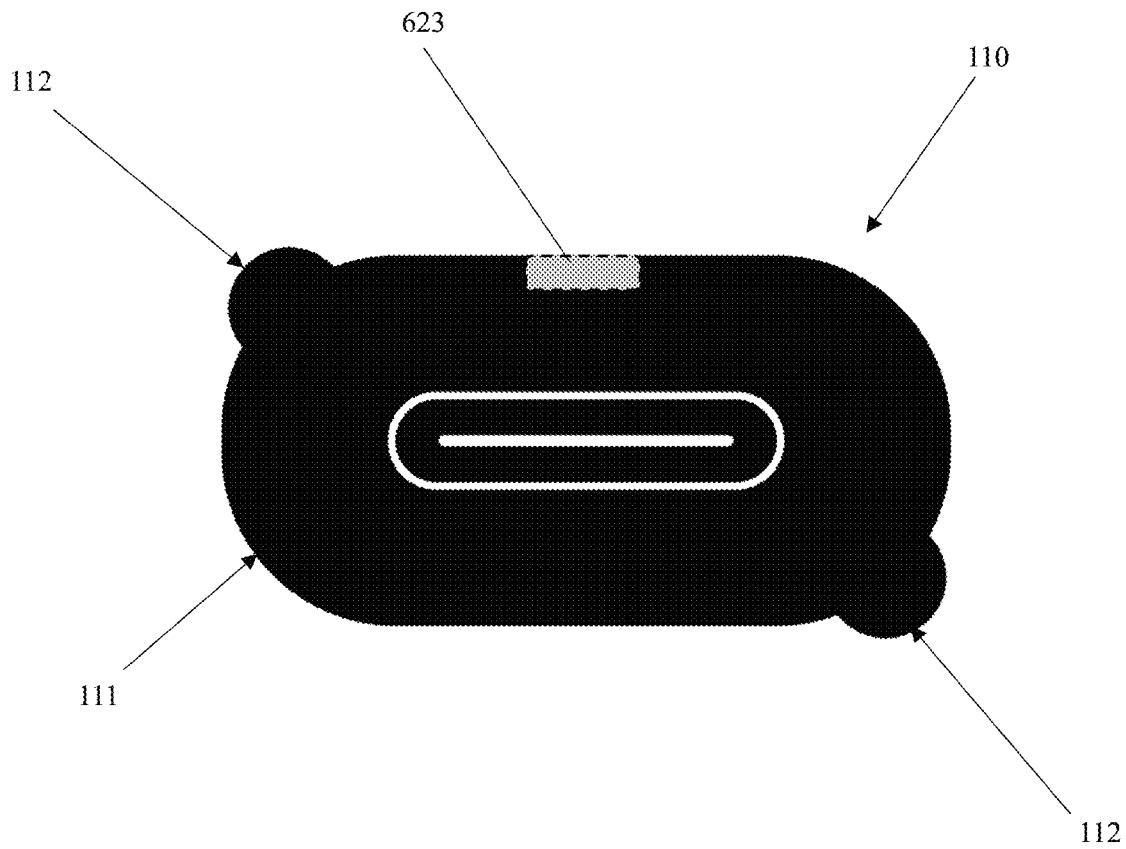
FIG. 6 is an enlarged view of a USB-C PD port employable by the cinematography battery pack of FIG. 3 or the battery mount plate of FIG. 5.

Referring particularly to FIGS. 2A, 2B, and 6, the system 100 includes a receiving orifice 111 arranged about the USB-C PD port 110. A mechanical securing assembly 132 extends from the housing 130. The mechanical securing assembly 132 is arranged about the USB-C connector 131. The mechanical securing assembly 132 is configured to be removably received in the receiving orifice 131 to securely couple the housing 130 about the USB-C PD port 110.

In an aspect of the present disclosure, the mechanical securing assembly 132 includes a shroud 133 arranged at least partially circumferentially around the USB-C connector 131. A space may be defined between an inner surface of the shroud 133 and an outer surface of the USB-C connector 131. The shroud 133 is configured to be removably received in the receiving orifice 111 to removably couple the housing 130 with a battery (e.g., battery pack 301) or a battery mount plate (e.g., battery mount plate 501), as described or incorporated by reference herein.

In an aspect of the present disclosure, a slot 112 is defined in the receiving orifice 111 and may extend outwardly therefrom. A projection 134 may extend from the shroud 133. The projection 134 is configured to be removably received in the slot 112. As an example, two slots and two corresponding projections may be defined about the shroud 133; however, other arrangements may be employed, and a single or three or more projections and corresponding slots may be employed. The projection(s) and corresponding slots may define a semi-circular or semi-oval shape; however, other arrangements may similarly be employed.

The mechanical connection assembly 132 may include a press-fit connection between the housing 130 and the USB-C PD port 110, a snap-fit connection between the housing 130 and the USB-C PD port 110, a tab and slot connection between the housing 130 and the USB-C PD port 110, a quick-release connection between the housing 130 and the USB-C PD port 110, or a detent ball connection between the housing 130 and the USB-C PD port 110.

The mechanical securing assembly 132 may extend at substantially a 90 degree angle with respect to an extending direction of power cable 120. Thus, in use, the housing 130 might not be physically removable from USB-C PD port 110 by pulling along the extending direction of power cable 120. This prevents unwanted removable of the mechanical securing assembly 132 from the USB-C PD port 110, thus preventing unwanted disruption in an electrical connection between the USB-C PD port 110 and a peripheral device. That is, disconnecting the mechanical securing assembly 132 and correspondingly the housing 130 from the USB-C PD port 110 may require advancing the housing 130 away from the USB-C PD port 110 at an angle of about 90 degrees with respect to the extending direction of the power cable 120.

The USB-C PD connections described are generally not polarity sensitive and may be rotated 180 degrees without a change in connectivity. That is, the housing 130 may be rotated 180 degrees with respect to the orientation illustrated in FIGS. 2A and 2B and can be similarly connected with USB-C PD port 110 both physically and electrically.

Referring particularly to FIGS. 2A, 2B, 3, 5, and 6 at least one metal or magnetic member (see, e.g., magnetic member 135) is coupled with or integrated into the housing 130. At least one corresponding metal or magnetic member (see, e.g., magnetic member 113 in FIG. 3) is arranged about the USB-C PD port 110 and configure to connect with magnetic member 135. A similar metal or magnetic member (see, e.g., magnetic member 513 in FIG. 5) may be arranged about port 510 of exemplary battery mount plate 501 (see FIG. 5). Additionally, or alternatively, another metal or magnetic member (see, e.g., magnetic member 136 in FIGS. 2A and 2B) may be arranged on the shroud 133 and configured to connect with a corresponding metal or magnetic member within a USB-C PD port (see, e.g., magnetic member 523 arranged in USB-C PD port 510 of battery mount plate 501 in FIG. 5, or magnetic member 623 arranged in USB-C PD port 110 of battery 501 in FIG. 6). The metal or magnetic members are configured to be removably coupled with each other to securely couple the housing 130 about the USB-C PD port 110.

Unless otherwise indicated herein, port 510 has substantially the same arrangement as port 110 described herein, and thus duplicative descriptions may be omitted.

In an aspect of the present disclosure, magnetic member 136 may be replaced with a protrusion configured to mate with a corresponding orifice defined in a USB-C PD port. That is, magnetic members 523 and/or 623 may be replaced with an orifice within the corresponding USB-C PD port to receive a protrusion therein.

In an aspect of the present disclosure, the shroud 133 may be omitted, and the metal/magnetic connections described herein may be employed to couple housing 130 with the USB-C PD port 110.

Figure 7A:
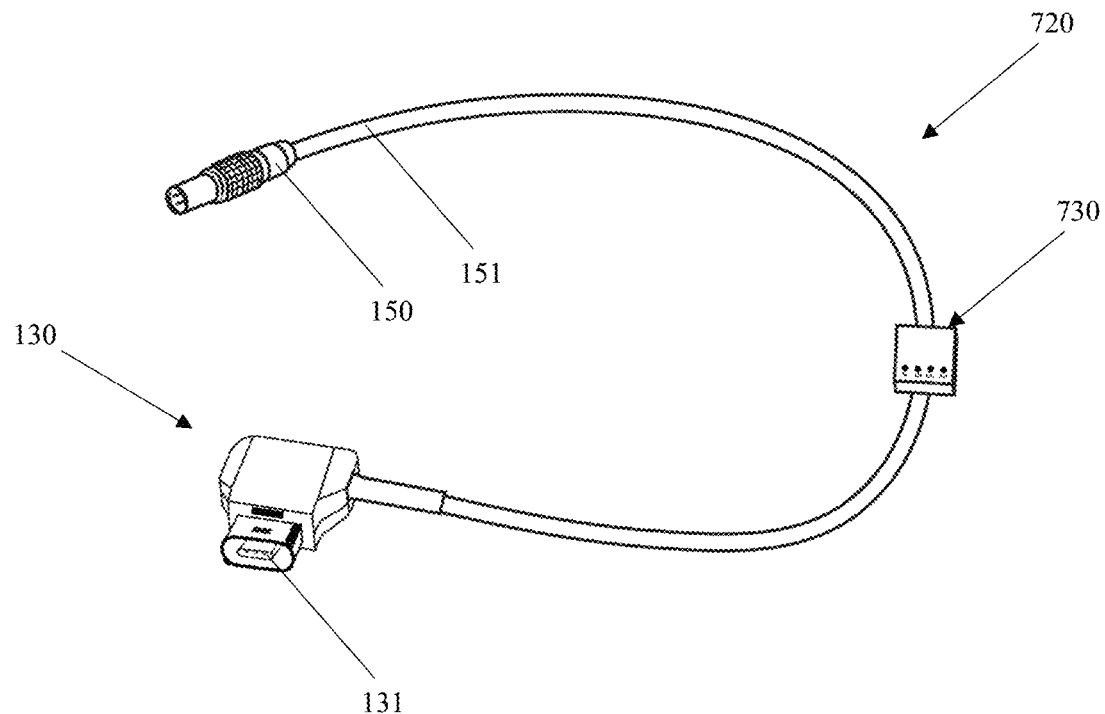
FIG. 7A is a top, perspective view of a power cable for providing power from a USB-C PD connection according to aspects of the present disclosure.
Figure 7B:
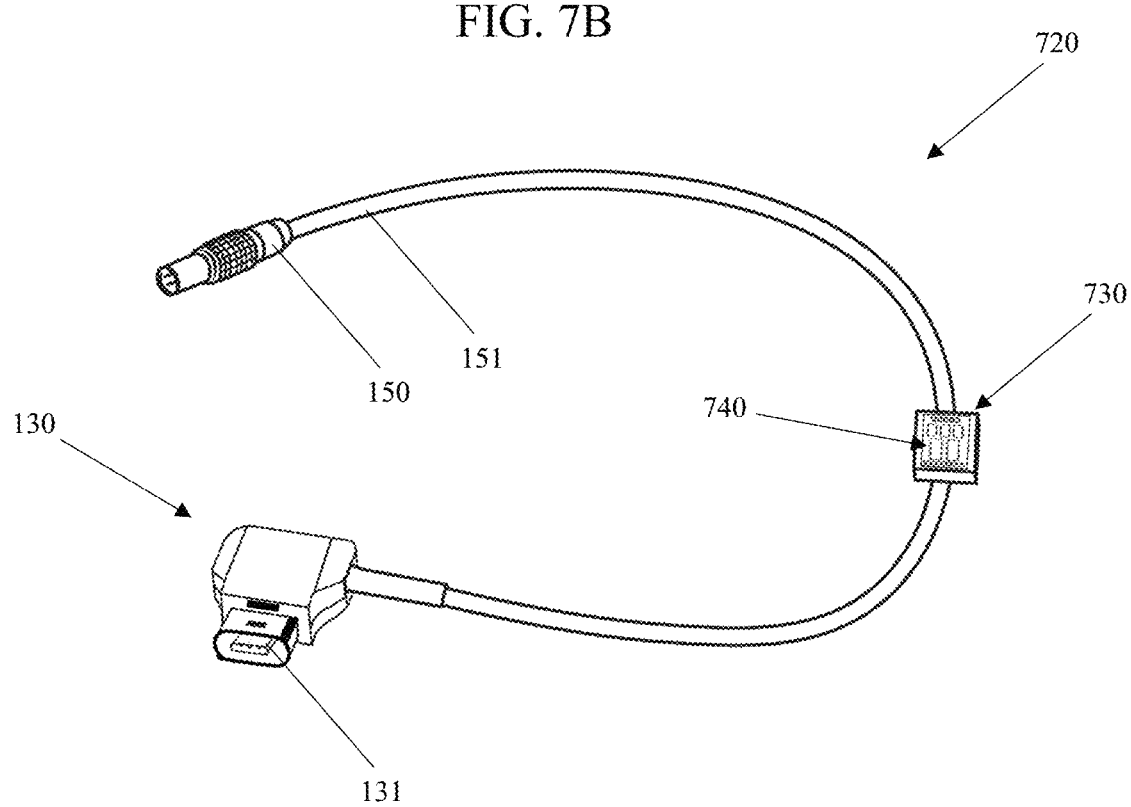
FIG. 7B is an interior view of the control circuit assembly of the power cable of FIG. 7A.

Unless otherwise indicated below, control circuit assembly 740 described below with reference to FIGS. 7A and 7B is substantially the same as control circuit assembly 140 described herein, and thus duplicative descriptions may be omitted.

Referring particularly to FIGS. 7A and 7B, the control circuit assembly 740 may be arranged in a housing 730 arranged along the power cable 720. The housing 730 holding the control circuit assembly 740 is spaced apart from the housing 130 including the USB-C connector 131.

In an aspect of the present disclosure, the USB-C PD port (e.g., port 110 or port 510) is configured to charge the cinematography battery pack 301. That is, while the USB-C PD ports described herein may be employed to output a desired voltage, the same ports may also be employed to provide a charging voltage to the cinematography battery pack 301 to charge the cinematography battery pack 301. As an example, the power cable 120 described herein may be employed to charge the cinematography battery pack 301. The USB-C PD port is configured to receive a number of available charging voltage from a power source, such as 5 v, 9 v, 12 v, 15 v, 20 v, 28 v, 36 v, and/or 48 v.

Referring particularly to FIGS. 1, 7A and 7B, an electrical connector 150 is defined at an end 151 of the power cable 120 opposite the housing 130. A substantially identical electrical connector 150 may be defined at end 151 of cable 720. The electrical connector 150 is configured to connect with a peripheral device to deliver the output voltage to the peripheral device. For example, the power cables 120 or 720 may be configured to transmit the output voltage to at least one of a light, a microphone, a camera, a monitor, a tablet computer, a desktop computer, or a laptop computer from a battery (e.g., battery pack 301) or a battery mount plate (e.g., battery mount plate 501), as described or incorporated by reference herein. As an example, the electrical connector may be a circular interconnect. Alternatively, the electrical connector may be a USB style interconnect.

Referring particularly to FIG. 2A, a number of visual indicators 137 are arranged on the housing 130. Similar visual indicators may be around on housing 730. The visual indicators 137 are configured to indicate the output voltage of the USB-C PD port.

Figure 8:
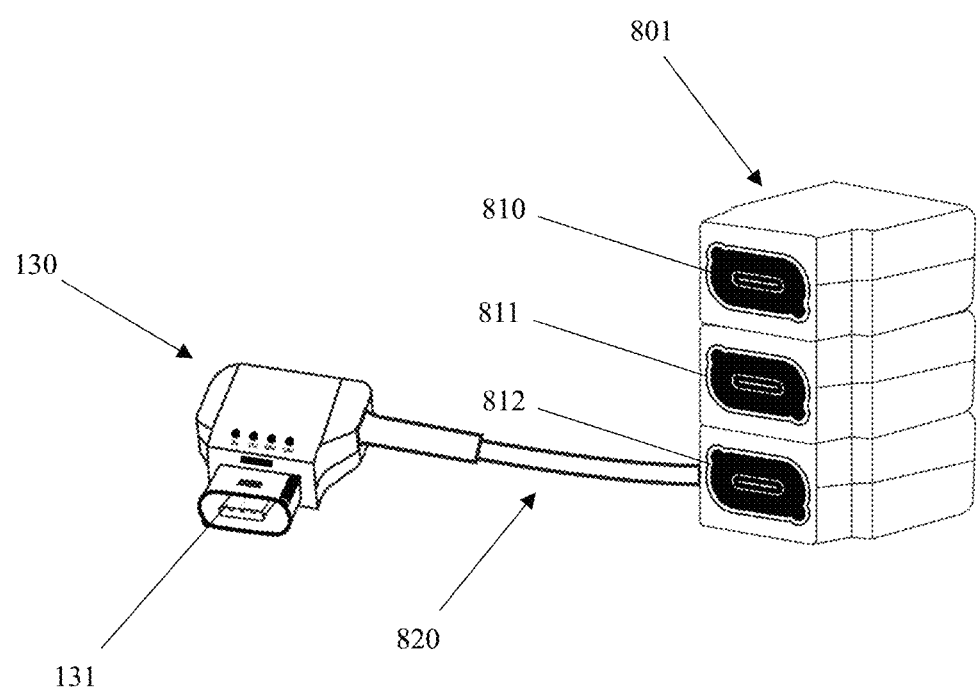
FIG. 8 is a top, perspective view of a power hub configured to connect with a USB-C PD port according to aspects of the present disclosure.

Unless otherwise indicated below, power cable 820 described below with reference to FIG. 8 is substantially the same as power cable 120 described herein, and thus duplicative descriptions may be omitted.

Referring to FIG. 8, a power hub 801 is electrically connected with the power cable 820 including housing 130. The power hub 801 includes a number of USB-C PD hub ports (e.g., ports 810, 811, and/or 812), each of which is configured to provide at least one of a number of output voltages. As an example, each hub port may be configured to output a different voltage. Each port (e.g., ports 810, 811, and/or 812) may have substantially the same arrangement as port 110 described herein.

An exemplary switching circuit for cinematography battery pack 301 is described in U.S. Pat. No. 10,630,095, the entire contents of which are incorporated by reference herein. The switching circuit may be employed to switch the output voltage provided by cinematography battery pack 301.

Dual voltage battery packs are described in U.S. Pat. No. 11,735,841, the entire contents of which are incorporated by reference herein, and U.S. Pat. No. 11,770,012, the entire contents of which are incorporated by reference herein.

The battery mount plate (e.g., mount plate 501) may be in the form of various battery mount arrangements, such as V-mount, G-mount, B-mount, or other arrangements configured to connect with a corresponding cinematography battery pack (e.g., cinematography battery pack 301) vie an electromechanical connection. Mount plates having different mounting arrangements for connecting with different types of batteries is described in U.S. Pat. No. 10,197,630, the entire contents of which are incorporated by reference herein. A mount plate having various features is described in U.S. Pat. No. 10,841,492, the entire contents of which are incorporated by reference herein.

Figure 9:
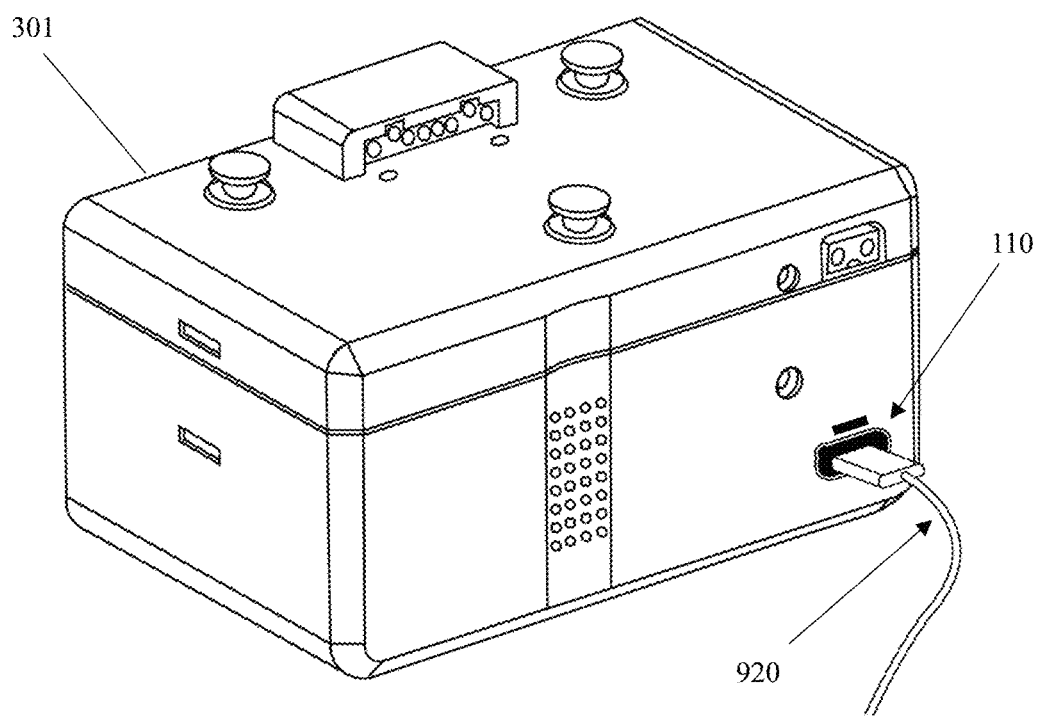
FIG. 9 is a top, perspective view of a cinematography battery pack including a USB-C PD port configured to connect with the USB-C PD connection of the power cable of FIG. 1 with a conventional USB-C device connected thereto.

Referring particularly to FIG. 9, should a standard USBC cable 920 be connected to the port 110 of the battery pack (e.g., pack 301 in FIG. 3) or plate (e.g., plate 501 in FIG. 5), and a USB-C PD compatible device is connected to the opposite end of the cable 920, the device will negotiate what voltage is required and upon successful "handshake" the port 110 will output the proper voltage.

Referring particularly to FIG. 10, a method 1000 of providing power from a USB-C PD connection includes providing a power cable including a housing including a USB-C connector configured to be removably coupled with a USB-C PD port to electrically connect the power cable with the USB-C PD port 1001. The power cable is configured to transmit at least one of a number of output voltages to a peripheral device from the USB-C PD port. A control circuit assembly is electrically connected with the housing. The control circuit assembly is configured to negotiate an output voltage between the peripheral device and the USB-C PD port. The method includes negotiating, by the control circuit, the output voltage between the peripheral device and the USB-C PD port 1002. The method includes providing the output voltage to the peripheral device 1003. The method includes powering or charging the peripheral device using the provided output voltage 1004.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for providing power from a USB-C PD connection, comprising:
 a USB-C power delivery (PD) port, wherein the USB-C PD port is configured to provide a plurality of output voltages;
 a power cable configured to be electrically connected with the USB-C PD port, wherein the power cable is configured to transmit at least one voltage of the plurality of output voltages to a peripheral device;

a housing coupled with the power cable, wherein the housing includes a USB-C connector configured to be removably coupled with the USB-C PD port to electrically connect the power cable with the USB-C PD port;

a control circuit assembly electrically connected with the housing, wherein the control circuit assembly is configured to negotiate an output voltage of the plurality of output voltages between the peripheral device and the USB-C PD port;

a receiving orifice arranged about the USB-C PD port; and a mechanical securing assembly extending from the housing and arranged about the USB-C connector, wherein the mechanical securing assembly is configured to be removably received in the receiving orifice to securely couple the housing about the USB-C PD port, wherein the mechanical securing assembly is spaced apart from the USB-C connector, wherein the mechanical securing assembly includes at least one shroud arranged at least partially circumferentially around the USB-C connector, wherein the at least one shroud is configured to be removably received in the receiving orifice, and wherein the at least one shroud defines an open space between the mechanical securing assembly and the USB-C connector.

2. The system of claim 1, further including:
at least one slot defined in the receiving orifice; and
at least one projection extending from the at least one shroud, wherein the at least one projection is configured to be removably received in the at least one slot.

3. The system of claim 1, wherein the mechanical securing assembly includes at least one of a press-fit connection between the housing and the USB-C PD port, a snap-fit connection between the housing and the USB-C PD port, a tab and slot connection between the housing and the USB-C PD port, a quick-release connection between the housing and the USB-C PD port, or a detent ball connection between the housing and the USB-C PD port.

4. The system of claim 1, further including;
a first metal or magnetic member coupled with the housing; and
a second metal or magnetic member arranged about the USB-C PD port, wherein the first metal or magnetic member and the second metal or magnetic member are configured to be removably coupled with each other to securely couple the housing about the USB-C PD port.

5. The system of claim 1, wherein the control circuit assembly is arranged in the housing.

6. The system of claim 1, wherein the control circuit assembly is arranged in a second housing arranged along the power cable, wherein the second housing is spaced apart from the housing.

7. The system of claim 1, wherein the USB-C PD port is arranged in a cinematography battery pack.

8. The system of claim 7, wherein the USB-C PD port is configured to charge the cinematography battery pack.

9. The system of claim 1, wherein the USB-C PD port is arranged in a battery mount plate for a cinematography battery pack.

10. The system of claim 9, wherein the battery mount plate includes a V-mount, a B-mount or a 3-stud mount battery connection.

11. The system of claim 1, further including an electrical connector defined at an end of the power cable opposite the housing, wherein the electrical connector is configured to connect with a peripheral device to deliver the output voltage of the plurality of output voltages to the peripheral device.

12. The system of claim 1, wherein the electrical connector is configured to connect with at least one of a light, a microphone, a camera, a monitor, a tablet computer, a desktop computer, or a laptop computer.

13. The system of claim 1, wherein the plurality of output voltages includes 5 volts, 9 volts, 12 volts, 15 volts, 20 volts, 24 volts, 28 volts, 36 volts, and 48 volts.

14. The system of claim 1, further including a plurality of visual indicators arranged on the housing, wherein the visual indicators of the plurality of visual indicators are configured to indicate the output voltage of the plurality of output voltages.

15. The system of claim 1, further including a power hub electrically connected with the power cable, wherein the power hub includes a plurality of USB-C PD hub ports configured to provide at least one output voltage of the plurality of output voltages.

16. A power cable for providing power from a USB-C PD connection, comprising:
a housing including a USB-C connector configured to be removably coupled with a USB-C PD port to electrically connect the power cable with the USB-C PD port, wherein the power cable is configured to transmit at least one voltage of a plurality of output voltages to a peripheral device from the USB-C PD port;

a mechanical securing assembly extending from the housing and arranged about the USB-C connector, wherein the mechanical securing assembly is configured to be removably received in a receiving orifice of the USB-C PD port to securely couple the housing about the USB-C PD port, wherein the mechanical securing assembly is spaced apart from the USB-C connector, wherein the mechanical securing assembly includes at least one shroud arranged at least partially circumferentially around the USB-C connector, wherein the at least one shroud is configured to be removably received in the receiving orifice, and wherein the at least one shroud defines an open space between the mechanical securing assembly and the USB-C connector; and a control circuit assembly electrically connected with the housing, wherein the control circuit assembly is configured to negotiate an output voltage of the plurality of output voltages between the peripheral device and the USB-C PD port.

* * * * *